UNITED STATES PATENT OFFICE.

JAMES HENDERSON, OF BELLEFONTE, PENNSYLVANIA, ASSIGNOR TO CHARLES G. FRANCKLYN, OF NEW YORK, N. Y.

COMPOUND FOR FURNACE-LININGS AND FIRE-BRICK.

SPECIFICATION forming part of Letters Patent No. 265,071, dated September 26, 1882.

Application filed September 1, 1882. (No specimens.)

*To all whom it may concern:*

Be it known that I, JAMES HENDERSON, of Bellefonte, county of Centre, and State of Pennsylvania, (formerly of New York city,) have invented a new and useful Improvement in Compounds for Furnace-Linings and Fire-Brick, of which the following is such specification as will enable those skilled in the art to understand and make the same.

This my invention is based on the discovery that silica in a finely-divided state may be made into a compound with water and glucose and alumina, lime, or magnesian lime, and a substance hard, firm, and refractory produced when dried.

In carrying out this my invention I use sea-sand of the purer qualities, or pulverized sand-stone such as is used in the manufacture of glass. River-sand such as is used in lining iron heating-furnaces, which does not contain oxide of iron or other substances that will form fusible compounds with those hereinbefore set forth, will answer the purpose. The sand is preferably reduced to a fine powder or flour, or so that it will pass through a sieve of about three thousand six hundred meshes to the square inch. The fire-clay (from which the alumina is derived) and lime or magnesian lime are reduced to flour and thoroughly mixed with the sand or silica in the dry state. Glucose and water in the proportion of one part of glucose to one and a third to one and a half part of water are mixed together and added to the admixed sand and fire-clay or lime or magnesian lime to form a thick mortar; or the glucose and water are mixed in the above proportions with the lime or magnesian lime to the consistency of milk, and this mixture is added to the silica or sand to form a thick mortar. The proportions of water to glucose may be increased to any desired extent; but such increase lessens the binding property which is given where the proportions above given are used.

The lime which I prefer to use is that made from dolomite by burning and slaking with water which contains a large proportion of magnesia. The alumina, lime, or magnesian lime should be present in about the proportions of five (5) per cent. of the whole compound when it is desired to produce a refractory compound which neither expands or contracts at highest temperatures; but the proportions of these substances may be more or less ranging from one to thirty-three per cent. of alumina and one to fifteen per cent. of lime or magnesian lime of the whole compound. When less than about five per cent. is used of alumina, lime, or magnesian lime, the compound is highly refractory, but expands slightly with the heat, and when a less quantity is used the compound is more readily affected by the heat, and is not so durable, although good results are obtained whether the compound contains under or over five (5) per cent. of the alumina, lime, or magnesian lime.

Magnesian lime and alumina are by weight the equivalents of lime for the purposes of this compound when used in the proportions hereinbefore given.

The effect of the glucose upon the compound of silica and alumina, or lime or magnesian lime, is that it renders the compound harder and firmer and better able to resist concussion than when the compound is used without it, so that when combined the good effect of all the ingredients is had in the compound.

The alumina which I have used is that preferably derived from fire-clay, sufficient being used to give the proper proportions of alumina. The fire-clay used should be as free as practicable from other substances than silica and alumina which will form fusible compounds with these substances, and the lime or magnesian lime should also be as free as practicable from all impurities which will form fusible compounds with the other substances.

Instead of the glucose I may use dextrine, starch, cellulose, mucilage, gum-arabic, molasses, or like substances from which sugar or starch may be extracted, which may be dissolved in the water added to the compound, or to the water wheat, rye, or other grain flour, pea, bean, or oat meal, wood pulp, or other like vegetable substances from which sugar or starch may be extracted, may be added in a finely-divided state and mixed with it into a thin paste, or so that the finely-divided substance is held in suspension, and this water is used to mix with the compound. For the purposes of this compound the above-designated substances are the equivalents of glucose when used as herein described.

The compound is made into a thick mortar and applied wet to the furnace, converter, or other vessel, or molded into brick and allowed to dry in the atmosphere, when it is ready for use; or, if preferred, the bricks may be burned in kilns.

I do not wish to be understood as limiting myself to the proportions of glucose or analogous substances for giving the binding and hardening property to the compound, as the compound is useful for refractory furnace-linings and fire-brick without glucose, and is the subject of another application, so that any less proportion may be used, and a proportionately less useful effect be obtained.

What I do claim, and desire to secure by Letters Patent, is—

The compound for furnace-linings or fire-brick, consisting of silica, glucose, water, and lime, or its herein-described equivalents, as specified and set forth.

JAMES HENDERSON.

Witnesses:
W. L. BENNEM,
G. G. FRELINGHUYSEN.